No. 739,213. PATENTED SEPT. 15, 1903.
J. M. E. PFROM.
MECHANICAL MOVEMENT.
APPLICATION FILED SEPT. 26, 1902.
NO MODEL.
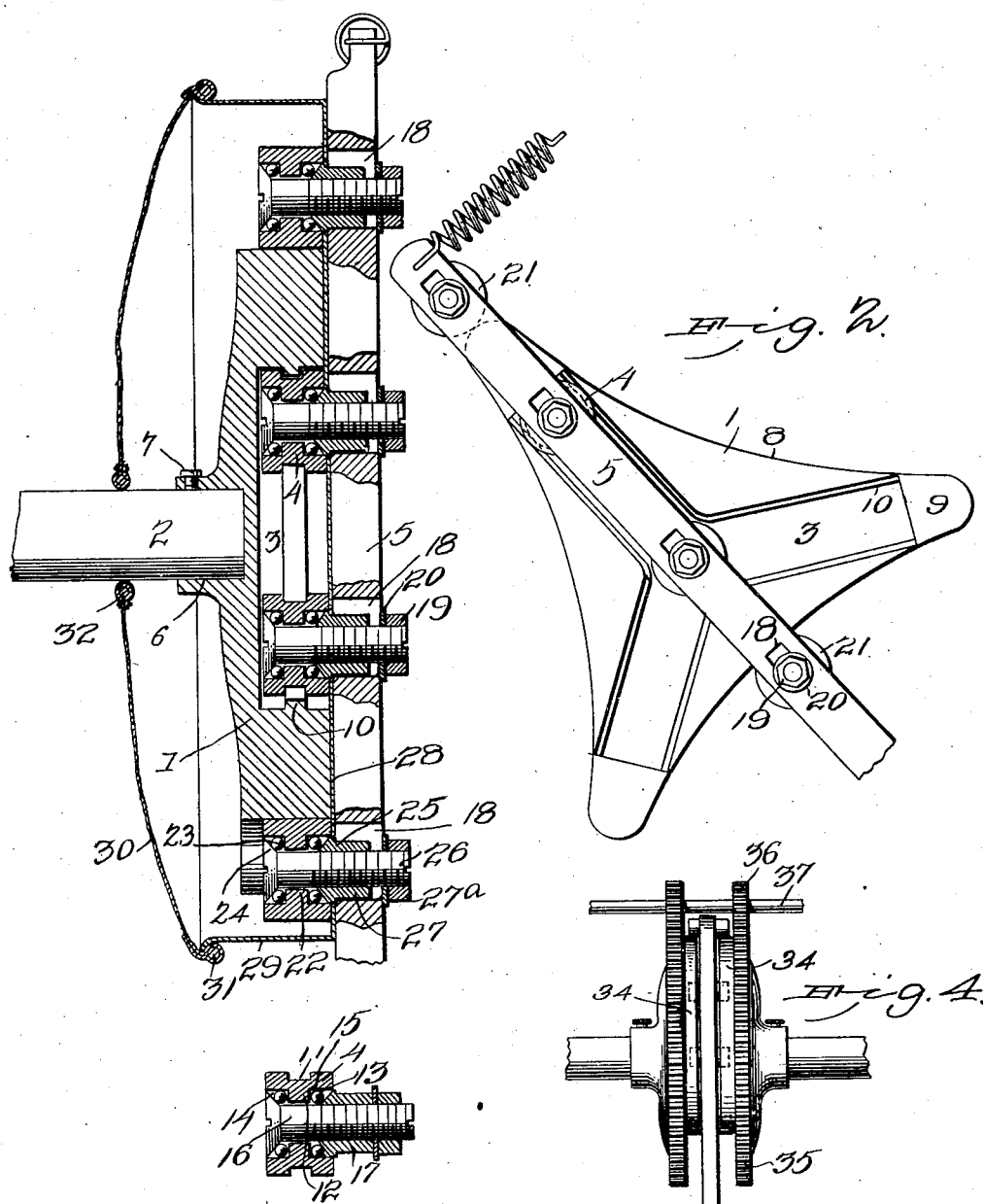

No. 739,213. Patented September 15, 1903.

UNITED STATES PATENT OFFICE.

JOHN MARTIN EDWARD PFROM, OF MORRISTOWN, MINNESOTA.

MECHANICAL MOVEMENT.

SPECIFICATION forming part of Letters Patent No. 739,213, dated September 15, 1903.

Application filed September 26, 1902. Serial No. 125,004. (No model.)

*To all whom it may concern:*

Be it known that I, JOHN MARTIN EDWARD PFROM, a citizen of the United States, residing at Morristown, in the county of Rice and State of Minnesota, have invented a new and useful Mechanical Movement, of which the following is a specification.

The invention relates to improvements in mechanical movements.

The object of the present invention is to improve the construction of mechanical movements for converting rotary motion into reciprocating motion and to provide a simple, inexpensive, and efficient device of great strength and durability adapted to reduce the friction to a minimum and capable of producing a rapid reciprocation of a pitman.

A further object of the invention is to provide a mechanical movement of this character in which the parts will be effectually protected from dust.

The invention consists in the construction and novel combination and arrangement of parts hereinafter fully described, illustrated in the accompanying drawings, and pointed out in the claims hereto appended.

In the drawings, Figure 1 is a sectional view of a mechanical movement constructed in accordance with this invention, the section being taken longitudinally of the pitman. Fig. 2 is an elevation of the same. Fig. 3 is a detail view illustrating the construction of the grooved rollers. Fig. 4 is an elevation illustrating another form of the invention.

Like numerals of reference designate corresponding parts in all the figures of the drawings.

1 designates an approximately triangular plate mounted on a drive-shaft 2 and provided with grooves or ways 3 for the reception of inner rollers 4 of a pitman 5. The plate, which is provided at one side with a suitable hub or socket 6 to receive the shaft 2, is secured to the same by a clamping-screw 7 or other suitable means and is in the form of an equilateral triangle, the sides presenting concave faces 8 and the points or projecting portions 9 being rounded. The walls of the grooves 3, which extend from the center of the plate to the projections 9, are provided with longitudinal ribs or tongues 10, adapted to engage annular grooves 11 of the rollers 4.

The rollers 4 consist of sleeves provided with interior ribs 12, forming opposite interior annular ball-races receiving antifriction-balls 13, which are interposed between the sleeve and cone-bearings 14 and 15. The cone-bearing 14 consists of the tapered head of the screw 16 and the cone-bearing 15 consists of the tapered end of a sleeve 17, interiorly threaded and adjustably mounted on the threaded portion of the screw and provided with a polygonal exterior to fit into an oblong slot 18 of the pitman, whereby it will be held against rotary movement in the same. The screw passes through the slot 18 and is engaged by an exterior nut 19, a disk or washer 20 being interposed between the nut and the pitman. The screw is provided in its ends with grooves for the reception of a screwdriver, and the antifriction-balls, which are interposed between the cones and the sleeve or roller proper, support the latter and enable the same to rotate frictionlessly. The cone-bearings are designed to be suitably hardened or otherwise constructed to enable them to withstand wear.

The rotary plate or element 1 is arranged between a pair of exterior rollers 21, constructed substantially the same as the inner rollers, with the exception that their peripheries are not grooved and are arranged to run on the exterior edges of the rotary element. The roller 21 is provided with an interior rib 22, forming ball-races, which receive antifriction-balls 23, and the latter are interposed between cones 24 and 25. The cone 24 consists of the tapered head of a screw 26, and the other cone 25 consists of a sleeve 27, arranged on the screw 26, which is secured to the pitman by a nut 27$^a$ and which has a washer interposed between the nut and the pitman. When the plate or element is rotated by the drive-shaft, the pitman is rapidly reciprocated, the outer rollers being alternately engaged by the projecting portions of the rotary element, which forms actuating-cams, and the inner rollers being guided by the grooves of the rotary element. In order to protect the bearings and the ways from dust, a casing 28 of cylindrical form is secured to the pitman and consists of a disk or plate and an annular flange 29, the disk or plate being interposed between the pitman and the rotary element and being provided with perforations to receive the sleeves which form the cone-bearings. The sleeves are provided adjacent to their heads or tapered portions with shoulders, which fit against the inner face of the plate or body portion of the casing. The flange 29 of the casing is connected with a flexible wall or cover 30, constructed of suitable material and adapted to yield to the reciprocation of the pitman. The outer edge of the flexible wall or covering is secured to the flange 29 by means of a ring 31, and the inner end is attached to the shaft by means of a ring 32; but any other suitable means may be employed for attaching the wall or cover to the flange and to the shaft. The slots 18 permit the rollers to be adjusted, and the casing is adjustable with the rollers, and the openings thereof are sufficient in size to permit the rollers to be adjusted independently of it.

In Fig. 4 of the drawings is illustrated another form of the invention, in which the pitman 33 is operated by a pair of rotary elements 34, having peripheral teeth 35 and actuated by pinion 36 of a shaft 37. The pitman and the rotary elements are constructed as before described.

It will be seen that the mechanical movement is exceedingly simple and inexpensive in construction, that it is adapted for use on all kinds of machinery for converting a rotary motion into a reciprocatory motion, and that the piston is rapidly reciprocating with a minimum amount of friction. It will also be seen that the exterior cam portions of the rotary element and the ways effectually prevent any dead-center and that there is always a positive force carrying the pitman forward and over the dead-center.

In order to reduce the friction further and render the device effective where the most rapid reciprocating is required, the pitman may be supported by a spring 34, forming a yielding support and designed to be connected with any suitable portion of the framework of a machine. Where the reciprocation of the pitman is slow, the spring may be omitted.

What I claim is—

1. In a mechanical movement, the combination with a rotary member provided with inner guides and an outer continuous cam-face, of a pitman, and devices connected with the pitman and operated by the guides and cam, during the rotation of the member, to reciprocate the pitman, said continuous outer cam being of triangular form; whereby the pitman will be reciprocated three times during each rotation of the member.

2. In a mechanical movement, the combination with a rotary member provided with inner guides and an outer continuous cam-face, of a pitman, and antifriction-rollers connected with the pitman and operated by the guides and cam, during the rotation of the member, to reciprocate the pitman, said continuous outer cam being of triangular form.

3. In a mechanical movement, the combination with a rotary member provided with an outer continuous cam of triangular form and inner guides extending outward from the center of the member toward the apexes of the triangular cam, of a pitman, and antifriction-rollers connected with the pitman and operated by the guides and cam to reciprocate the pitman; whereby the pitman will be reciprocated three times during each rotation of the member.

4. The combination with a rotary member provided with inner guideways having lateral ribs or tongues and an outer cam-face of triangular form, of a pitman, and antifriction-rollers connected with the pitman and operated by the guides and cam, during the rotation of the member, to reciprocate the pitman, said antifriction-rollers which coöperate with the inner guides being provided with grooves engaging the tongues on the guides.

5. A device of the class described comprising a rotary element having exterior cam-faces and provided with ways, a pitman, and inner and outer antifriction devices arranged in the ways and on the exterior of the rotary element, and consisting of a screw having a cone-bearing, an adjustable sleeve arranged on the screw and having a cone-bearing, a roller arranged on the screw and provided with ball-races, balls arranged in the races and interposed between the roller and the cone-bearings, and means for securing the screw to the pitman, substantially as described.

In testimony that I claim the foregoing as my own I have hereto affixed my signature in the presence of two witnesses.

JOHN MARTIN EDWARD PFROM.

Witnesses:
HERMAN BURGER,
F. W. RIDGEWAY.